United States Patent [19]

Berthoux et al.

[11] 3,872,173

[45] Mar. 18, 1975

[54] PROCESS OF MANUFACTURING PARA-TERT-BUTYL-PHENOL

[75] Inventors: Jean Berthoux, Decines; Ghislain Schwachhofer, Miribel, both of France

[73] Assignee: Progil, Paris, France

[22] Filed: July 6, 1970

[21] Appl. No.: 52,732

[30] Foreign Application Priority Data

July 11, 1969  France .............................. 69.23923

[52] U.S. Cl............................. 260/624 E, 260/624 C
[51] Int. Cl.............................................. C07c 39/06
[58] Field of Search ............ 260/624 R, 624 C, 619, 260/624 E

[56] References Cited
UNITED STATES PATENTS

| | | |
|---|---|---|
| 2,051,473 | 8/1936 | Evans et al...................... 260/624 C |
| 2,054,270 | 9/1936 | Schuellen et al................ 260/624 R |
| 2,091,565 | 8/1937 | Perkins et al. .................. 260/624 R |
| 2,140,782 | 12/1938 | Arnold et al...................... 260/624 |
| 2,337,123 | 12/1943 | Olin ............................... 260/624 R |
| 2,732,408 | 1/1956 | Foole ................................. 260/624 |
| 2,975,216 | 3/1961 | Spacht ........................... 260/624 C |
| 3,211,670 | 10/1968 | Kaplan................................ 252/414 |

*Primary Examiner*—Bernard Helfin
*Assistant Examiner*—W. B. Lone
*Attorney, Agent, or Firm*—Browdy and Neimark

[57] ABSTRACT

Para-tert-butyl-phenol is prepared by introducing a gaseous mixture of isomer butenes into phenol in the presence of an acid-activated clay catalyst.

10 Claims, No Drawings

PROCESS OF MANUFACTURING PARA-TERT-BUTYL-PHENOL

The present invention relates to a process of manufacturing para-tertio-butyl-phenol by phenol alkylation by means of isobutene, in the presence of acid-activated clays as catalysts, and more particularly to the use, as isobutene source, of a mixture of isomer butenes.

The fabrication of tert.alkylphenols by phenol alkylation by means of branched olefins is a very well known technique. However, it is generally recommended to use an hydrocarbon raw material as free as possible from linear olefins, in order to avoid the formation of sec.alkylphenols. It is understood that this condition represents a disadvantage as it implies the need to separate previously the required olefin from the mixtures containing it, such as for example, light cuts coming from operations of petroleum products cracking.

Of course, the possibility has been contemplated to use mixtures of isomer olefins in view of the preparation of a tert.alkylphenol. For example, this possibility has been mentioned in some documents, but without giving sufficient details concerning the conditions which permit obtaining good results.

Other publications relate to polyalkylphenols preparation, which constitutes a less delicate problem. However, for the specific case of para-tert.-butylphenol, a method has been described which consists of alkylating phenol with a mixture of isobutene-butenes, in the presence of aluminum phenate as a catalyst, at temperatures of preferably between 90 and 130°C, then of separating the obtained butylated phenol from catalyst and contacting it with fresh phenol, at 70-130°C in the presence of a classical alkylation catalyst (British Pat. No. 1,062,298 dated Feb. 19, 1965). This method is an expensive one and has shown itself to be relatively complex, since it requires two separate catalytic reactions, and the recovery of the intermediary butylated phenol between those two reactions.

Moreover, the manufacture of alkylphenols, especially mono-alkylphenols, poses another problem which is the selective alkylation on a determined carbon of the phenol ring. In particular, it is known that it is possible to obtain a final product containing a not negligible quantity of ortho isomer. In the relatively recent literature, it has been shown that the presence of a determined quantity of water in the reaction mixture favored the formation of para-alkyl-phenols to the prejudice of other isomers (British Pat. No. 1,020,460 dated Dec. 13, 1962).

The present invention provides a process of manufacturing para-tert.-butyl-phenol from phenol and from a mixture of isomer butenes, according to which only a simple type of catalyst is used and which allows isobutene to be fixed selectively and to obtain the desired product, in a great degree of purity. Based upon the principle of initial introduction of gaseous mixture in a wet medium, it shows moreover that contrary to prior art teaching, water removing from the alkylation mixture, achieved at a determined stage of reaction, leads to an optimal yield into para-tertiobutylphenol.

In its most general form the process according to the present invention comprises introducing a gaseous mixture of isomer butenes into phenol added with an acid activated clay, containing a quantity of moisture representing 0.5 to 5 percent by weight of water with regard to phenol, maintaining, in the liquid mixture, a temperature not exceeding 55°C, then, the passage of gases having stopped, submitting the reaction mixture to a temperature not exceeding about 120°C, while dehydrating it by an azeotropic distillation.

In the present description, the mixture of isomer butenes refers to a product containing isobutene and butene-1 and/or butenes-2 (cis and trans), but which may contain also saturated hydrocarbons such as butane, as well as, in minor proportion, other light non-saturated hydrocarbons. Typical examples of those mixtures are light cuts from petroleum products cracking.

For the application of the process according to the invention, it is possible to use butene mixtures containing some quantity of isobutene. Mixtures containing a weight ratio of at least 30 percent of isobutene have given especially good results.

In the step of gas introduction into phenol, temperature and water content of the mixture are critical conditions. These are mainly the operative measures which give rise to the selective fixation of isobutene by phenol and which avoid the reaction of other butenes. The temperature upper limit ranges to about 55°C, but it is better to work near the phenol melting point, that is 40°-50°C. The reaction being an exothermal one, it is necessary to contemplate measures for cooling the reaction mixture. As previously indicated, a water quantity added to the catalyst and the phenol represents 0.5 to 5 percent based on the weight of phenol. Practically, in order to obtain the desired moisture rate, generally a catalyst is used which contains 10 to 30 percent of water, especially 15 to 25, with regard to its anhydrous weight. Preferably it is made in such a manner that activated clay calculated in a dry matter, is present in a ratio of between 5 and 15 percent, more especially 8 to 12, with regard to the weight of the initial phenol feeding. If there is only an anhydrous or not enough hydrated catalyst, it is easy to achieve reaction under the prescribed conditions, by addition to the catalyst or to the phenol of the corresponding water quantity. The catalytic compound is chosen from among acid-activated clays, of known type, based upon products such as montmorillonite, silico-aluminates, silica gel, etc. In the process according to the invention it is possible to use products known under the trade names of Clarsil $PC_1$ (from C.E.C.A. firm), K 10 (from Sud-Chemie A.G. firm) Fulcat 22 B (from Laporte Industries Ltd. firm).

Moreover, in order to obtain still better isobutene selective fixation by phenol, to the prejudice of normal butenes, it may be advantageous to vary the gas introduction speed. First gas is passed at a quick rate, for a time as long as the isobutene content in the gaseous mixture is weaker, then the hydrocarbon feeding speed is reduced. For example, after passing of the gaseous mixture for 30 minutes according to a given rate, it is possible to reduce from one-fifth to one-half the initial speed, during feeding continuation.

When operating under the conditions mentioned hereinabove, phenol fixes generally, in mean value, a proportion of the introduced gas, which, for mixtures containing 30-55 percent of isobutene, is fairly equal to the weight percentage of the branched olefin contained in the used mixture, or slightly lower.

In order to avoid the formation of an important quantity of polyalkylated phenols, especially of di- and trialkylphenols, it is advantageous to manage the operation in such a way that the phenol is not entirely alkylated.

For example, it is possible to foresee that after the olefin introduction step, the molar ratio of free or combined phenol, in the total organic mass, to the fixed isobutene, is not lower than 1.5 and is preferably equal to 2 or greater.

Olefin fixation by phenol is made easier by stirring the phenol during gaseous mixture introduction. Moreover, olefin absorption is achieved preferably, under a normal pressure.

When reaching the desired molar ratio in the mixture, the gas introduction is stopped and, as indicated hereinabove, a thermal treatment of the reaction mass proceeds, with dehydration of the reaction mixture by distillation. This operation is intended for transforming into para-tertbutyl-phenol, the products which are present in the form of ortho isomer, of di- and tri-butylphenols and of phenol ethers.

In this operative step, as in the previous one, the indicated upper limit of temperature, that is about 120°C, is a critical one. If it is heated fairly beyond this limit, there is noted an important formation of meta-tert.-butylphenol, which is not easily separable from the para isomer. The most favorable temperature range, to obtain a paratertbutylphenol of great purity and a convenient reaction speed, ranges between 110° and 115°C.

In a parallel way to this heating, the dehydration of the reaction mixture proceeds. For this, pressure is reduced little by little in order to remove water by means of the distillation of water/phenol azeotrope. At 110°–115°C pressure is advantageously decreased at about 30-40 mm. Hg.

According to a variant, the reaction mixture may be dehydrated, not by means of water/phenol azeotrope but in achieving an azeotropic distillation with the help of an aliphatic hydrocarbon. When using hexane for this, for example, the process is made easier, since with hexane/water azeotrope, water is entirely distilled under atmospheric pressure without exceeding the maximum temperature of 120°C. For the application of this variant, the hydrocarbon is introduced into the reaction mixture, after the olefin absorption phase. However, it is also possible to charge the hydrocarbon from the beginning of the process, that is before passing the butenes mixture into the phenol. Moreover, this method has the advantage of allowing olefin absorption at a temperature lower than the phenol melting point, that is below 40°C.

Whatever may be the adopted dehydration mode, when this is ended, thermal reaction may still be carried on for some time. On the whole, a treatment time - including dehydration - of between 1 and 3 h. is generally necessary.

At the end of this treatment, since the manufacture of para-tert.-butylphenol is ended, the catalyst is separated from the reaction mixture by filtration or decantation, then the compounds are recovered by distillation, preferably under a reduced pressure. Phenol in excess is distilled, then ortho-tertio-butylphenol, then para-tertbutylphenol. The distillation residue is constituted mainly of di- and tri-butylphenols. When using the variant including the use of an aliphatic hydrocarbon, it is recovered first by distillation under normal pressure.

The non-transformed phenol, the ortho-tert-butylphenol and the heavy products may be recycled to the reaction, from the beginning of the process. According to a variant, ortho isomer and distillation residue may be submitted to a thermal treatment at 120°C at most, after addition of fresh phenol and of the catalyst of the described hereinabove type, used in the anhydrous state. This operation permits recovery of a further fraction of para-tert-butylphenol.

The process according to the present invention leads to the obtaining of para-tert-butylphenol in a yield of the range of from 91 to 95 percent with regard to converted phenol. This yield is still increased, when recycling or treating secondary products. This purity of final product may easily reach 99.3 percent and its crystallization point is about 98.4 – 98.5°C.

The process has been described hereinabove for use in a discontinuous way, but it may easily be adapted for a continuous running, for example, by use of a reactor for olefin absorption and another one for thermal treatment and dehydration.

The examples hereinafter, given in a non-limitative way, emphasize the advantages brought by the present invention.

EXAMPLE 1 a. In a flask provided with a mechanical stirrer, a descending pipe and a distillation column, there were charged 1200 g. of phenol and an acid-activated clay known under the trade name of Clarsil PC-1 in a quantity corresponding to 96 g. of anhydrous products and 15.4 g. of water. The temperature being brought to 40°C, there was introduced by the descending pipe, a raw cut of hydrocarbons in $C_4$ containing about 50.5 percent by weight of isobutene and 45.5 percent of normal butenes, at a rate of 120 l/h. for 30 minutes and 85 l/h. for 3 hours. Gas feeding has been made while stirring the mixture continuously and maintaining the temperature at 40°C during the entire operation. After stopping gas passage, the mixture was brought to 110°C. Then, while maintaining a temperature of 110°–115°C, pressure was decreased progressively to 40 mm. Hg in order to distil water/phenol azeotrope. 32 g. of azeotrope were recovered. After 1 /h. 30 minutes of total treatment time at 110°–115°C, heating was stopped and 1636 g. of reaction mixture were obtained, before filtration. This product was filtered and the filter cake was washed with benzene. By distillation of the filtrates, benzene was removed and there was recovered, under 80 mm Hg., first 554 g. of phenol, then 113.5 g. of an intermediary fraction containing 20.5 percent of ortho-tert-butyl-phenol and 24.9 percent of para isomer and at least 800 gr. of para-tertbutyl phenol having a crystallization point of 98.3°C. Distillation balance represents a yield of 94.2 percent with regard to converted phenol. (Analyses have been made by vapor phase chromatography, with internal sampling). Excess phenol, the intermediary fraction, as well as the distillation residue have been reused in a subsequent operation.

In a comparative way, the following tests were conducted, in which one of the operative conditions according to the invention was not applied.

b. The process was conducted under the same conditions as hereinabove, but using, from the beginning, a catalyst having no moisture. There was obtained a yield in paratertbutylphenol of only 82.2 percent with regard to converted phenol. This yield loss was due to an important fixation of normal butenes which have been found again in the final mixture, especially in the form of o.sec.butyl-phenol.

c. The process was conducted under the same conditions as in a) but maintaining the mixture temperature at 80°C, during gas feeding. Para-tert-butylphenol yield was 87.0 percent with regard to converted phenol.

d. The process was conducted under the same conditions as in a) but without any water azeotropic distillation. The yield in desired product was 88.6 percent; yield loss in this case being due to the presence of ortho and poly-tert-butyl-phenols.

e. The process was conducted under the same conditions as in (a) but accomplishing thermal treatment at 130°C. There was obtained a yield fairly identical in desired product but this one had a crystallization point of only 95.1°C because of meta-tert-butylphenol formation.

EXAMPLE 2

A test of the same type as in Example 1(a) hereinabove, was conducted, using 1200 g. of phenol, 108 g. of anhydrous Clarsil $PC_1$ added with 17.8 g. of water and 510 l. of butene mixture, fed in 3 h. 15. Absorption temperature was maintained at 40°C. Then 200 g. of hexane were introduced, the mixture was brought to 115°C and the azeotrope hexane/water was distilled. At the end of a total time of treatment, at about 115°C, of 1h. 45, the reaction mass was treated as described in the previous example, with washing of the filter cake by means of hexane. A para-tertbutylphenol was obtained with a crystallization point of 98°C, in a yield of 94.7 percent with regard to converted phenol.

EXAMPLE 3

Another test of the same type as in example 1 a) hereinabove was made starting with 1,200 g. of phenol, of an acid-activated decolorising clay known under the trade name of Fulcat 22 B in a quantity corresponding to 108 g. of anhydrous product and 26 g. of water, and of 510 l. of butenes mixture fed in 3 h. 15. Absorption temperature was maintained at 40°C. After stopping the gas feed, the mixture was brought to 110°C, then, while maintaining this temperature, pressure was progressively decreased to 35 mm Hg in order to distil the azeotrope phenol/water. After a total time of treatment at 110°C of 1h. 30, the same operations as in Example 1 a) were conducted, in order to recover the desired product. There was obtained a para-tertbutylphenol having a crystallization point of 98.2°C in a yield of 94 percent with regard to the converted phenol.

It will be obvious to those skilled in the art that various changes may be made without departing from the scope of the invention and the invention is not to be considered limited to what is described in the specification.

What is claimed is:

1. In a process of manufacturing para-tert-butylphenol from phenol and isobutene which comprises reacting said isobutene with liquid phenol mixed with an acid-activated clay, the improvement comprising providing said isobutene in the form of a gaseous mixture with normal butenes, and wherein the reaction mixture contains a quantity of moisture representing 0.5 to 5 percent by weight of water with respect to phenol, the reaction being carried out in two stages comprising (1) maintaining the liquid mixture at a temperature not exceeding 55° C. in the presence of said acid-activated clay and said water and during feeding of said gaseous mixture and (2) then, stopping the introduction of said gaseous mixture at a point such that after the olefin introduction step the molar ratio of free or combined phenol in the reaction mass to fixed isobutene is not lower than 1.5; and submitting the reaction mixture without intermediate treatment to a temperature of about 110°C. to about 120°C. while dehydrating it by azeotropic distillation.

2. Process according to claim 1 wherein an activated clay is used, which contains 10 to 30 percent of water, with regard to its anhydrous weight and that said clay is present in a quantity of between 5 and 15 percent by weight of dry matter, with respect to the initial phenol charge.

3. Process according to claim 1 wherein gas introduction is conducted while maintaining the liquid phase at a temperature of between 40° and 50°C.

4. Process according to claim 1 wherein gas introduction is conducted at a decreasing speed.

5. Process according to claim 1 wherein the thermal treatment is made at 110°–115°C.

6. Process according to claim 1 wherein dehydration is conducted by distillation of water/phenol azeotrope under a reduced pressure of 30-40 mm. Hg.

7. Process according to claim 1 wherein an aliphatic hydrocarbon is added to the mixture and dehydration is conducted by distillation of the azeotrope water/aliphatic hydrocarbon.

8. Process according to claim 7 wherein the aliphatic hydrocarbon is hexane.

9. Process according to claim 7 wherein gas introduction is conducted while maintaining the liquid medium at a temperature lower than 40°C.

10. Process according to claim 1 wherein gaseous mixture contains at least 30 percent by weight of isobutene.

* * * * *